US010348455B2

(12) United States Patent
Hoymann et al.

(10) Patent No.: US 10,348,455 B2
(45) Date of Patent: Jul. 9, 2019

(54) CONTROLLING A TRANSMISSION OF INFORMATION IN A WIRELESS COMMUNICATION NETWORK WITH A RELAY NODE

(71) Applicant: Telefonaktiebolaget LM Ericsson (publ), Stockholm (SE)

(72) Inventors: Christian Hoymann, Aachen (DE); Henning Wiemann, Aachen (DE)

(73) Assignee: Telefonaktiebolaget LM Ericsson (publ, Stockholm (SE)

( * ) Notice: Subject to any disclaimer, the term of this patent is extended or adjusted under 35 U.S.C. 154(b) by 43 days.

(21) Appl. No.: 15/282,018

(22) Filed: Sep. 30, 2016

(65) Prior Publication Data

US 2017/0019217 A1    Jan. 19, 2017

Related U.S. Application Data

(63) Continuation of application No. 15/003,277, filed on Jan. 21, 2016, now Pat. No. 9,467,974, which is a
(Continued)

(51) Int. Cl.
*H04L 1/18* (2006.01)
*H04L 1/16* (2006.01)
(Continued)

(52) U.S. Cl.
CPC .......... *H04L 1/1812* (2013.01); *H04B 7/155* (2013.01); *H04L 1/1671* (2013.01);
(Continued)

(58) Field of Classification Search
CPC ............ H04W 72/005; H04W 72/042; H04W 72/0413; H04W 72/0446; H04W 72/1278;
(Continued)

(56) References Cited

U.S. PATENT DOCUMENTS 8,234,535 B2 * 7/2012 Parkvall .............. H04L 1/1803
714/749
8,472,362 B2 * 6/2013 Kenehan ............. H04W 76/048
370/311
(Continued)

FOREIGN PATENT DOCUMENTS

CN          101039304 A       9/2007
CN          101047431 A      10/2007
(Continued)

OTHER PUBLICATIONS

Fujitsu, "Discussions on HARQ for LTE-A over Un interface", 3GPP TSG-RAN WG2 Meeting #66b, Los Angeles, US, Jun. 29, 2009, pp. 1-6, R2-093991, 3GPP.
(Continued)

*Primary Examiner* — Rasheed Gidado
(74) *Attorney, Agent, or Firm* — Coats & Bennett, PLLC

(57) ABSTRACT

The present invention relates to a transmission of information in a wireless communication network between a radio access node and a relay node, wherein, according to a new ground rule, for each allocated downlink subframe for a downlink transmission from the access node to the relay node, an uplink transmission subframe for an uplink transmission is allocated four transmission time intervals later. A downlink subframe is only allocated when a further subframe of the same transmission time interval for a transmission from the relay node to the user equipment is a subframe of a type that indicates to a user equipment that no data are received beyond a control region of the subframe.

26 Claims, 6 Drawing Sheets

Related U.S. Application Data continuation of application No. 13/391,009, filed as application No. PCT/EP2010/062209 on Aug. 23, 2010, now Pat. No. 9,246,641.

(60) Provisional application No. 61/293,789, filed on Jan. 11, 2010, provisional application No. 61/235,874, filed on Aug. 21, 2009.

(51) Int. Cl.
*H04B 7/155* (2006.01)
*H04W 72/00* (2009.01)
*H04W 72/04* (2009.01)
*H04W 72/12* (2009.01)
*H04W 84/04* (2009.01)
*H04L 12/18* (2006.01)

(52) U.S. Cl.
CPC .......... *H04L 1/1854* (2013.01); *H04L 1/1887* (2013.01); *H04W 72/005* (2013.01); *H04W 72/042* (2013.01); *H04W 72/0413* (2013.01); *H04W 72/0446* (2013.01); *H04W 72/1278* (2013.01); *H04L 12/189* (2013.01); *H04W 84/047* (2013.01)

(58) Field of Classification Search
CPC ... H04L 1/1812; H04L 1/1671; H04L 1/1854; H04L 1/1887
See application file for complete search history.

(56) References Cited

U.S. PATENT DOCUMENTS

| | | | |
|---|---|---|---|
| 8,472,991 B2* | 6/2013 | Pelletier | H04W 56/005 455/517 |
| 8,774,081 B2* | 7/2014 | Park | H04B 7/155 370/315 |
| 8,787,277 B2* | 7/2014 | Kim | H04B 7/15542 370/329 |
| 2008/0081651 A1 | 4/2008 | Kuroda et al. | |
| 2009/0164862 A1 | 6/2009 | Sagfors et al. | |
| 2009/0217119 A1 | 8/2009 | Zhang et al. | |
| 2009/0296668 A1 | 12/2009 | Capone | |
| 2010/0027538 A1 | 2/2010 | Harada et al. | |
| 2011/0111693 A1 | 5/2011 | Nakao et al. | |
| 2011/0317614 A1 | 12/2011 | Park et al. | |
| 2012/0026935 A1 | 2/2012 | Park et al. | |
| 2014/0219215 A1 | 8/2014 | Brucknell et al. | |

FOREIGN PATENT DOCUMENTS

| | | |
|---|---|---|
| JP | 2011509586 A | 3/2011 |
| RU | 2008103829 A | 8/2009 |
| WO | 2006016457 A1 | 2/2006 |
| WO | 2007083219 A2 | 7/2007 |
| WO | 2008096877 A1 | 8/2008 |
| WO | 2008105620 A1 | 9/2008 |
| WO | 2009094525 A1 | 7/2009 |
| WO | 2009101816 A1 | 8/2009 |

OTHER PUBLICATIONS

Samsung, "HARQ operation for relay", 3GPP TSG RAN WG2 #67, Aug. 18, 2009, pp. 1-4, R2-094878, 3GPP.
Ericsson, "Efficient Support of relays through MBSFN subframes", TSG-RAN WG1 #55, Prague, Czech Republic, Nov. 10, 2008, pp. 1-4, R1-084357, 3GPP.
Research in Motion, UK Limited, "DL HARQ operation over the Un and Uu interfaces", 3GPP TSG RAN WG2 Meeting #66, San Francisco, US, May 4, 2009, pp. 1-4, R2-093123, 3GPP.
Fujitsu, "Discussion on HARQ for LTE-A over Un Interface", 3GPP TSG-RAN WG2 Meeting #66, SAn Francisco, US, May 4, 2009, pp. 1-6, R2-093279, 3GPP.
Fujitsu, "Impact of UL Backhaul existence on PRACH slot configuration", 3GPP TSG-RAN1 #57, San Francisco, US, May 4, 2009, pp. 1-6, R1-091964, 3GPP.
Research in Motion UK Limited, "DL HARQ Operation over Un interface", 3GPP TSG RAN WG2 Meeting #66bis, Los Angeles, US, Jun. 29, 2009, pp. 1-6, R2-093733, 3GPP.
Research in Motion UK Limited, "DL HARQ Operation over Un interface", 3GPP TSG RAN WG2 Meeting #67, Shenzhen, CN, Aug. 24, 2009, pp. 1-4, R2-094288, 3GPP.
Research in Motion UK Limited, "UL HARQ Operation over Un interface", 3GPP TSG RAN WG2 Meeting #67, Shenzhen, CN, Aug. 24, 2009, pp. 1-4, R2-094286, 3GPP.
Fujitsu, "Discussions on HARQ for LTE-A over Un interface", 3GPP TSG RAN WG2 Meeting #67, Shenzhen, CN, Aug. 24, 2009, pp. 1-8, R2-095837, 3GPP.
Ericsson et al., "Backhaul L1/L2 Control signaling", TSG-RAN WG1 #58bism Miyazaki, JP, Oct. 12, 2009, p. 1, R1-094284, 3GPP.
Ericsson, et al. "HARQ Operation for Relaying", 3GPP TSG-RAN WG2 #68, Jeju, Korea, Oct. 9, 2009, pp. 1-4, Tdoc R2-096762, 3GPP.
Ericsson, "HARQ and Control Signaling for Relaying", 3GPP TSG-RAN WG2 #67-bis, Miyazaki, JP, Oct. 12, 2009, pp. 1-6, Tdoc R2-095804, 3GPP.
Ericsson et al., "Un HARQ timing alternatives", 3GPP TSG-RAN WG1 #59bis, Valencia, Spain, Jan. 18, 2010, pp. 1-4, Tdoc R1-100058, 3GPP.
Ericsson et al., "Un HARQ timing alternatives", 3GPP TSG-RAN WG1 #60, San Francisco, US, Feb. 22, 2010, pp. 1-4, Tdoc R1-100864, 3GPP.
Ericsson et al., "Un HARQ timing for FDD", 3GPP TSG-RAN WG1 #60bis, Beijing, CN, Apr. 12, 2010, pp. 1-4, Tdox R1-101749, 3GPP.
Ericsson et al., "Un HARQ timing for FDD", 3GPP TSG-RAN WG1#61, Montreal, Canada, May 10, 2010, pp. 1-4, Tdoc R1-102636, 3GPP.
Ericsson et al., "Un HARQ timing for FDD", 3GPP TSG-RAN WG1 #61bis, Dresden,Germany, Jun. 28, 2010, pp. 1-4, Tdoc R1-103513, 3GPP.
Research in Motion UK Limited, "UL HARQ Operation over Un interface", 3GPP TSG RAN WG2 Meeting #68bis, Valencia, Spain, Jan. 18, 2010, pp. 1-4, R2-100411, 3GPP.
ZTE, "Backhaul UL Subframe Allocation in TDD LTE-A Relay", TSG-RAN WG1 #61, Montreal, Canada, May 10, 2010, pp. 1-8, R1-102916, 3GPP.
Motorola, "Relay HARQ", 3GPP TSG RAN WG1 Meeting #61, Montreal, Canada, May 10, 2010, pp. 1-4, R1-103174, 3GPP.
Motorola, "Relay HARQ", 3GPP TSG RAN WG1 Meeting #61bis, Dresden, Germany, Jun. 28, 2010, pp. 1-6, R1-103923, 3GPP.
Panasonic, "Comparison of UL/DL HARQ for backhaul", 3GPP TDG-RAN WG1 Meeting #61bis, Dresden, Germany, Jun. 28, 2010, pp. 1-6, R1-103775, 3GPP.
ZTE, "Discussion on Un UL HARQ RTT for FDD", TSG-RAN WG1 #61bis, Dresden, Germany, Jun. 28, 2010, pp. 1-6, R1-103583, 3GPP.
Panasonic, "Comparison of UL/DL HARQ for backhaul", 3GPP TSG-RAN WG1 Meeting #61bis, Dresden, Germany, Jun. 28, 2010, pp. 1-8, R1-104133, 3GPP.
Ericsson et al., "On HARQ operation for type 1 relays", 3GPP TSG-RAN WG1 #59, Jeju, Korea, Oct. 9, 2009, Tdoc R1-094450, 3GPP.
Nokia et al., "Implicit ACK/NAK for LTE DL", 3GPP TSG-RAN WG1 Meeting #49 bis, Orlando, US, Jun. 25, 2007, pp. 1-2, R1-072996, 3GPP.
Catt et al., "DL and UL Backhaul Subframe Allocation for Type I Relay in LTE-A", 3GPP TSG RAN WG1 #57, San Francisco, US, May 4, 2008, pp. 1-3, R1-091989, 3GPP.
Alcatel-Lucent Shanghai Bell et al., "Discussion on the collision between Un and Uu for relay operation", TSG-RAN WG2#67, LA, US, Jun. 29, 2009, pp. 1-3, R2-094342, 3GPP.

(56) References Cited

OTHER PUBLICATIONS

Interdigital, "FDD Relay Type I Backhaul interference and HARQ issues", 3GPP TSG-RAN WG1 Meeting #57bis, Los Angeles, CA, US, Jun. 29, 2009, pp. 1-5, R1-092587, 3GPP.

3rd Generation Partnership Project, "3rd Generation Partnership Project; Technical Specification Group Radio Access Network; Evolved Universal Terrestrial Radio Access (E-UTRA); Multiplexing and channel coding (Release 8)", Technical Specification, 3GPP TS 36.212 V8.7.0, May 1, 2009, pp. 1-60, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 8)", Technical Specification, 3GPP TS 36.213 V8.7.0, May 1, 2009, pp. 1-77, 3GPP, France.

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 8)", Technical Specification, 3GPP TS 36.321 V8.6.0, Jun. 1, 2009, pp. 1-47, 3GPP, France.

Nokia Corporation, et al., "NDI Handling", 3GPP TSG-RAN WG1 Meeting #54, Jeju, Korea, Aug. 18, 2008, pp. 1-2, R1-083101, 3GPP.

Alcatel-Lucent Shanghai Bell, et al., "Type II Relay Considerations with the Separation of Control and Data Discussion and Decision", 3GPP TSG RAN WG1 #58, Shenzhen, P. R. China, Aug. 24, 2009, pp. 1-8, R1-093357, 3GPP.

Qualcomm Europe, "Removal of Interpretation of NDI Information in 36.213", 3GPP TSG-RAN WG1 #54, Aug. 18, 2008, pp. 1-2, R1-083240, 3GPP.

Ericsson, "Correction to NDI semantics", Change Request, 3GPP TSG-RAN2 Meeting #67, Shenzhen, China, Aug. 24, 2009, pp. 1-4, R2-094167, 3GPP.

Panasonic, "DL ACK/NACK modulation and UL HARQ behaviour." 3GPP TSG-RAN WG1 Meeting #50bis, Shangahi, China, Oct. 8-12, 2007, pp. 1-5. R1-074404, 3GPP.

3GPP. "Text proposal on backhaul resource assignment." TSG RAN WG1 Meeting #57, San Francisco, CA. May 2009. R1-092249. 3GPP.

Samsung. "DL backhaul physical channel design for Type 1 relay." 3GPP TSG RAN WG1 Meeting #58. Shenzhen, China, Aug. 24-28, 2009. R1-093384. 3GPP.

* cited by examiner

| | | Frame | 1 | | | | | | | | | | 2 | | | | | | | | | |
|---|---|---|---|---|---|---|---|---|---|---|---|---|---|---|---|---|---|---|---|---|---|---|
| | | Subframe | 0 | 1 | 2 | 3 | 4 | 5 | 6 | 7 | 8 | 9 | 0 | 1 | 2 | 3 | 4 | 5 | 6 | 7 | 8 | 9 |
| | | HARQ iD | 2 | 3 | 4 | 5 | 6 | 7 | 0 | 1 | 2 | 3 | 4 | 5 | 6 | 7 | 0 | 1 | 2 | 3 | 4 | 5 |
| Backhaul DL Share | 30% | DL Data eNB-R | D | D | | | | | D | D | D | D | | | D | D | D | D | | | D | |
| | 30% | nr of UL FBs | 0 | 0 | 1 | 0 | | 1 | 0 | 0 | 0 | 0 | 1 | 1 | 1 | 0 | 0 | 0 | 0 | 0 | 0 | 0 |
| | 30% | UL FB R-eNB | | | UAN | | UAN | | | | | | UAN | UAN | UAN | | | | | | | |
| Backhaul UL Share | 30% | UL Data R-eNB | | | U | | | U | | | | | U | U | U | | | | | | | |
| | | Next Opportunity [RTTs] | | | 1 | | 2 | | | | | | 2 | 2 | 1 | | | | | | | |
| | | MBSFN | | S | | | | | S | S | S | | | | | | | | S | S | | |
| Access DL Share | 70% | DL Data R-UE | D | | D | | D | D | | | | D | D | | D | D | D | D | D | | D | D |
| | 70% | UL FB UE-R | UAN | UAN | | UAN | UAN | | UAN | UAN | UAN | | | | | UAN | UAN | UAN | UAN | UAN | UAN | UAN |
| Access UL Share | 70% | UL Data UE-R | U | U | | U | U | | U | U | U | | | | | U | U | U | U | U | U | U |
| | | Next Opportunity [RTTs] | 1 | 1 | | 2 | 3 | | 1 | 1 | 1 | | | | | 2 | 1 | 1 | 1 | 1 | 2 | 3 |
| | 50% | DL FB R-UE | | | DAN | DAN | DAN | DAN | | A | A | | DAN | DAN | DAN | DAN | | | | | DAN | DAN |
| | 28% | Uu UL TX without immediate ReTX opportunity | | | | | | | | | | | | | | | | | | | | |

FIG. 4

| | Frame | 1 | | | | | | | | | | 2 | | | | | | | | | |
|---|---|---|---|---|---|---|---|---|---|---|---|---|---|---|---|---|---|---|---|---|---|
| | Subframe | 0 | 1 | 2 | 3 | 4 | 5 | 6 | 7 | 8 | 9 | 0 | 1 | 2 | 3 | 4 | 5 | 6 | 7 | 8 | 9 |
| | HARQ ID | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 |
| Backhaul DL Share 31% | DL Data eNB-R | | D | D | D | | | | | | | D | D | D | | | | | | | |
| | nr of UL FBs | 0 | 0 | 0 | 0 | 0 | 1 | 1 | 0 | 0 | 0 | 0 | 0 | 0 | 0 | 0 | 1 | 1 | 0 | 0 | 0 |
| 29% | UL FB R-eNB | | | | | | UAN | UAN | UAN | | | | | | | | UAN | UAN | UAN | | |
| Backhaul UL Share 29% | UL Data R-eNB | | | | | | U | U | U | | | | | | | | U | U | U | | |
| | Collision: DL Data or DL FB but no MBSFN | | | | | | | | | | | | | | | | | | | | |
| | MBSFN | | S | S | S | | | | | | | | S | S | S | | | | | | |
| Access DL Share 69% | DL Data R-UE | D | | | | D | D | D | D | D | D | D | | | | D | D | D | D | D | D |
| | Uplink Grant | G | | | | G | G | G | G | G | G | G | | | | G | G | G | G | G | G |
| 71% | UL FB UE-R | UAN | UAN | UAN | UAN | UAN | | | | UAN | UAN | UAN | UAN | UAN | UAN | UAN | | | | UAN | UAN |
| Access UL Share 71% | UL Data UE-R | U | U | U | U | U | | | | U | U | U | U | U | U | U | | | | U | U |
| | Available Retransmissions | 1 | 1 | 2 | 3 | | | 0 | 0 | 2 | 3 | 1 | 1 | 2 | 3 | | | 0 | 0 | 2 | 3 |
| | Next Opportunity [RTTs] | 1 | 1 | 1 | 1 | | | 2 | 2 | 2 | 1 | 1 | 1 | 1 | 1 | | | 2 | 2 | 2 | 1 |
| 50% | DL FB R-UE | A | A | A | A | DAN | DAN | DAN | DAN | | | A | A | A | A | DAN | DAN | DAN | DAN | | |
| 28% | Uu UL TX without immediate ReTX opportunity | | | | | | | | | | | | | | | | | | | | |

FIG. 5

CONTROLLING A TRANSMISSION OF INFORMATION IN A WIRELESS COMMUNICATION NETWORK WITH A RELAY NODE

RELATED APPLICATIONS

The present application is a continuation of U.S. application Ser. No. 15/003,277, filed Jan. 21, 2016, which is a continuation of U.S. application Ser. No. 13/391,009, filed Mar. 21, 2012, now U.S. Pat. No. 9,246,641, which is the national stage entry under 35 U.S.C. 371 of international application no. PCT/EP2010/062209, filed Aug. 23, 2010, which in turn claims the benefit of provisional application No. 61/293,789 filed Jan. 11, 2010, and provisional application No. 61/235,874, filed Aug. 21, 2009, each of which applications are incorporated herein by reference in their entirety.

TECHNICAL FIELD

The present invention relates to a method for controlling a transmission of information in a wireless communication network between a radio access node and a relay node, to the radio access node and to the relay node.

BACKGROUND

LTE (Long Term Evolution) of 3rd Generation Partnership telecommunication systems Release 10 is supposed to support inband relaying. In this situation a donor eNode B (eNB) communicates to the relay node which in turn exchanges data with a user equipment and the same spectrum is used for the eNodeB-relay and relay-user equipment links. At least the relay-user equipment links shall be backward compatible to Release 8 (Rel-8). A relay node (RN) must avoid self-interference, i.e., while transmitting to a user equipment (UE) it cannot receive from its donor eNB and while receiving from a UE it cannot transmit towards its donor eNB because reception and transmission of the relay node would in both cases be in the same frequency band and can thus not easily be filtered out. Self-interference at the relay can be avoided by dedicating certain subframes to the eNB-RN (Un) link.

In a relay scenario a scheduler in the radio access node, e.g. an eNB, schedules all data transmission and allocates transmission resources to the RNs and UEs in the coverage area. Another scheduler is located in each relay node and allocates transmission resources to its associated UEs. Naturally, a scheduler in the relay node may only allocate resources for Uu transmission that are not scheduled for Un transmission.

Another user equipment can also be directly connected to the eNB and may directly communicate with the eNB without the involvement of the relay node over a Uu interface.

Obviously, the relay operation is different from the operation of a Rel-8 FDD (Frequency Division Duplex) eNB, which can transmit to its UEs in any DL (downlink) subframe. In Rel-8 it is possible to configure certain subframes as MBSFN (Multi-media Broadcast Multicast Service over Single Frequency Network) subframes which indicate to the UEs that they are not supposed to receive data beyond the control region (PCFICH (Physical Control Format Indicator Channel), PDCCH (Physical Downlink Control Channel) and PHICH (Physical HARQ Indicator Channel)) in the first 1-2 symbols of the subframe. Note that MBSFN subframes have less OFDM (Orthogonal Frequency Division Multiplex) symbols available for L1/L2 control than regular subframes. However, MBSFN subframes can only be configured for subframes 1, 2, 3, 6, 7 and 8. In other subframes (0, 4, 5 and 9) at least Rel-8 UEs expect to receive the Broadcast Channel, Synchronization Channels and paging information.

Un subframes affect the HARQ (Hybrid Automatic Repeat Request) timing and the associated control signaling defined for Rel-8. The HARQ feedback is synchronous, i.e., it is sent in subframe n+4 if the corresponding data was received in subframe n. This applies to both uplink (UL, transmission towards the eNB) and downlink DL, (transmission towards the user equipment). On the uplink also the retransmissions are synchronous, i.e., they must appear in subframe n+8. Downlink retransmissions can be scheduled asynchronously, in subframe n+8 or later.

The different periodicities of MBSFN patterns (10 ms or 40 ms) and uplink HARQ (8 ms) precludes Rel-8 conform protocol operation on Un and Uu.

Since the pattern of Un subframes does not match the Rel-8 HARQ timing, a modification of the Un HARQ control handling and a definition for Un subframe allocation are required.

SUMMARY

Accordingly, a need exists to provide a rule for Un subframe allocation and to provide the possibility to use the HARQ process in the Un interface.

This need is met by the features of the independent claims. In the dependent claims embodiments of the invention are described.

According to a first aspect of the invention a method for controlling a transmission of information in a wireless communication network between a radio access node and a relay node is provided, the information being transmitted in a sequence of subframes. A subframe comprises a control region and an information region containing the transmitted information, the subframe corresponding to a transmission time interval (TTI). According to a first step of the invention, a downlink subframe for a downlink transmission of information from the access node to the relay node is allocated, wherein the downlink subframe or a downlink transmission is only allocated when a further subframe of the same transmission time interval for a transmission from the relay node to the user equipment is a subframe of a type that indicates to the user equipment that no data are received beyond the control region. For each allocated downlink subframe an uplink subframe for an uplink transmission of information from the relay node to the access node is allocated four transmission time intervals later. This new ground rule of allocating uplink Un subframes four transmission time intervals after each downlink subframe ensures that for each Un downlink transmission a transmission opportunity for positive or negative acknowledgement ACK/NACK feedback is available.

The type of the further subframe may be a Multi-media Broadcast Multicast Service over a Single Frequency Network, MBSFN, subframe. When a subframe for the transmission from the relay node to the user equipment is a MBSFN subframe, the user equipment is informed that no information will be transmitted in this subframe The fact that no data are received beyond the control region means that no data will be received in this subframe and in particular that the subframe does not comprise reference symbols outside the control region which the UE may use for adjustment of the reception. When MBSFN subframes are used for a multicast or broadcast, information/payload may be received, but no information for this individual user equipment, but information transmitted in a broadcast format for multiple receivers. However, if MBSFN subframes are designated without including payload this avoids self interference at the relay node for the information region of the subframe. Self-interference for the control region is acceptable if the control region does not include control information for the relay node.

According to an embodiment of the invention a downlink subframe indicates a scheduling assignment for the transmission of information to the radio access node in the uplink subframe allocated four transmission time intervals later. This means that for each Un uplink transmission a scheduling assignment in form of an uplink grant can be issued.

When the downlink subframe from the radio access node to the relay node contains the transmitted information, the uplink subframe allocated four transmission time intervals later contains the acknowledgement feedback. The ground rules implies that there is an equal number of uplink and downlink Un subframes. However, the ratio between the Uu to Un subframes may vary.

According to another embodiment of the invention, when an uplink subframe is received from the relay node, corruption of the information contained in the received uplink subframe is checked during a HARQ process, and if the subframe is not detected as corrupted, no acknowledgement feedback is transmitted back to the relay node, wherein for a corrupted received uplink subframe an uplink grant is transmitted to the relay node in a next available downlink subframe associated with the HARQ process. The relay node assumes that the transmission was successful when no acknowledgement is received from the radio access node, i.e. it does not perform a retransmission without a further indication that data is corrupted. The uplink grant transmitted in the case of received corrupted information is transmitted in the next available downlink backhaul Un subframe corresponding to the same HARQ process.

According to another embodiment of the invention subframes for the downlink transmission of information to the relay node are allocated taking into account a configured periodicity of the subframe type in the transmission from the relay node to the user equipment. With the ground rule for Un subframe allocation and with the Un uplink HARQ process described above, Un subframes can be semi-statically allocated either in 8 ms, 10 ms, or any other periodicity, depending on the periodicity of the MBSFN subframes.

The invention furthermore relates to an access node of the wireless communication network, the radio access node comprising a scheduler allocating uplink subframes for an uplink transmission of information from the relay node to the radio access node and downlink subframes for a downlink transmission of information from the radio access node to the relay node, wherein the scheduler works according to the above-identified ground rule in which the scheduler only allocates a downlink subframe for a downlink transmission when a further subframe of the same transmission time interval for a transmission from the relay node to the user equipment is a subframe of the type that indicates to the user equipment that no data are received beyond the control region. According to the invention the scheduler is configured to allocate, for each allocated downlink subframe, an uplink subframe four transmission time intervals later.

The scheduler may be configured to indicate a scheduling assignment in the downlink subframe for the transmission of information to the radio access node in the uplink subframe allocated four transmission time intervals later. The scheduling assignment can be an uplink grant transmitted to the relay node four transmission time intervals before the information is sent in the uplink subframe.

Furthermore, the radio access node may also contain a HARQ controller that is configured to determine during a HARQ process whether the information contained in an uplink subframe is corrupted or not. If the HARQ controller detects the subframe as not being corrupted, it does not transmit an acknowledgement feedback back to the relay node. If the HARQ controller detects that the subframe is corrupted, it may transmit an uplink grant to the relay node in a next available downlink subframe associated with said HARQ process. If the HARQ controller detects that the information is not corrupted, the uplink grant can contain an indicator indicating to the relay node that new data can be transmitted.

According to another aspect a relay node is provided, the relay node comprising a controller that is configured to transmit information in an uplink subframe to the radio access node four transmission time intervals after having received a scheduling assignment in a downlink subframe from the radio access node. The controller in the relay node controls that the ground rule as allocated by the radio access node is correctly followed in the relay node.

According to an embodiment of the invention the relay node comprises a HARQ controller which assumes successful reception of an uplink subframe at the radio access node if it does not receive an explicit feedback message acknowledging the uplink transmission in the uplink subframe. As the eNB does not transmit a feedback, the HARQ controller in the relay node assumes successful reception of the uplink subframe and does not wait for a positive feedback.

The controller in the relay node may be configured to transmit an acknowledgement feedback message for a downlink subframe in an uplink subframe four transmission time intervals after having received the downlink subframe. In this embodiment the controller in the relay node assures that the feedback message for a downlink transmission of information is sent in accordance with the newly set ground rule.

The relay node may furthermore comprise a scheduler which allocates the downlink subframes for a downlink transmission of information to a user equipment and the uplink subframes for the uplink transmission from the user equipment to the relay node. The scheduler should be configured to allocate subframes of a type that indicate to the user equipment that no data are received beyond the control region. This makes sure that the user equipment does not wait for data transmitted from the relay node when the latter receives data from the eNB.

The invention furthermore relates to a method for controlling a transmission of information in the wireless communication network between the radio access node and the relay node, wherein information in an uplink subframe for an uplink transmission to the relay node is transmitted four transmission time intervals after having received a scheduling assignment in a downlink subframe from the radio access node. A successful reception of the uplink subframe and the radio access node may be assumed by the relay node if no explicit feedback message acknowledging the uplink transmission in the uplink subframe is received. Furthermore, an acknowledgement feedback message for a downlink subframe is transmitted in an uplink subframe four transmission time intervals after having received the downlink subframe.

In an embodiment, a downlink subframe to the user equipment is configured as a subframe of a type that indicates to the user equipment that no data is to be received beyond the control region if said downlink subframe of the same transmission time interval is configured for a downlink transmission of information from the radio access node to the relay node. Furthermore, no uplink transmission from the user equipment to the relay node may be allocated in a subframe which is configured for uplink transmission from the relay node to the radio access node. This can be assured by the controller in the relay node mentioned above.

According to another embodiment the HARQ controller of the relay node is configured to check whether an indicator for new data is contained in an uplink grant received from the radio access node. If the indicator is contained in the uplink grant, the HARQ controller transmits new data to the radio access node. If the indicator is not contained in the uplink grant, already transmitted data, i.e. information that is already transmitted in the other subframes, is retransmitted. As the relay node does not receive an acknowledgement feedback, the relay node is informed whether the transmission of information was successful or not by the indicator for new data contained in the uplink grant received from the radio access node.

The different embodiments described above may be combined in any way.

BRIEF DESCRIPTION OF THE DRAWINGS

The invention will be described in further detail below with reference to the accompanying drawings, in which FIG. 4 shows a table with a HARQ timing of an Un subframe allocation with 8 ms periodicity, FIG. 5 shows a table with HARQ timing of Un subframe allocation with 10 ms periodicity.

DETAILED DESCRIPTION

Figure 1:
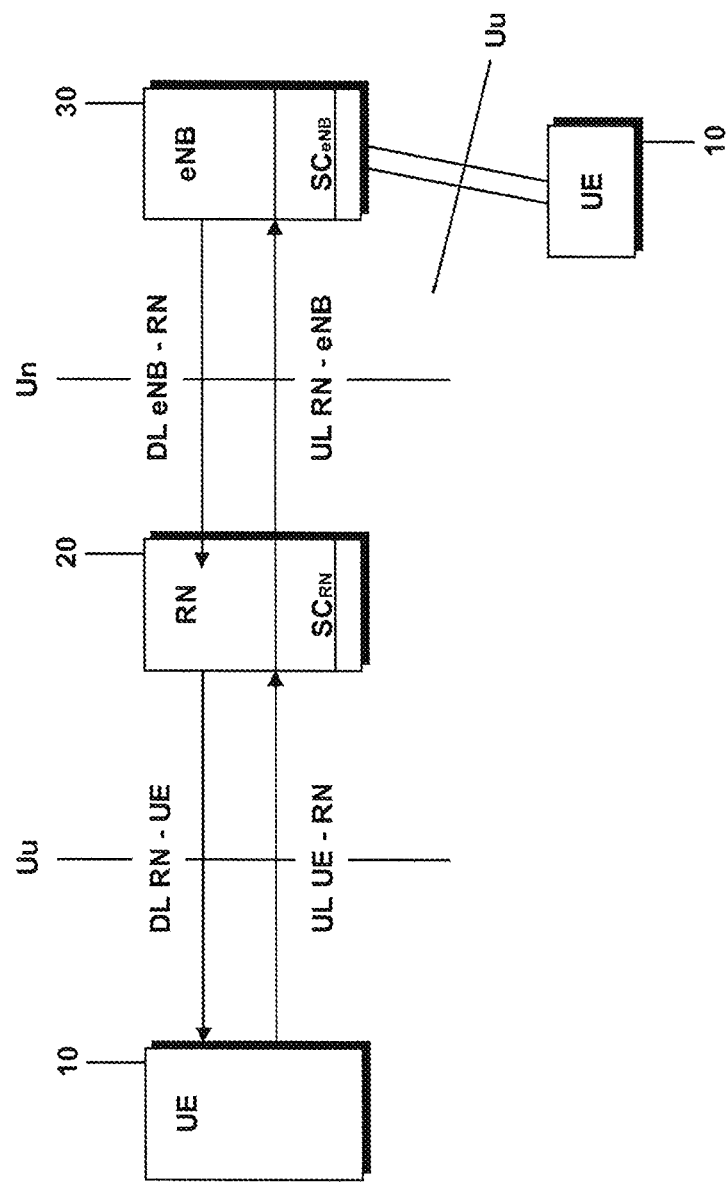
FIG. 1 shows a schematic view of a user equipment connected to an eNB via a relay node.

FIG. 1 shows a relay scenario in which the relay node 20 receives transmitted data and/or information from an upstream node, here the evolved node B (eNB) 30, which sends the received information to the user equipment 10. The interface between the user equipment 10 and the relay node is called Uu interface, and the interface between the relay node and the eNB is called Un interface. As also shown in FIG. 1 the user equipment 10 may also directly communicate with the eNB.

A scheduler SCeNB in the radio access node 30 schedules all data transmission and allocates transmission resources to the RNs and the UEs. Another scheduler SCRN is located in the relay node which allocates transmission resources to its associated UEs.

A user equipment may be a cellular phone, a personal digital assistant, a wireless modem, a handheld device, a laptop computer, etc. The Un interface is adapted by using a new ground rule in which uplink Un subframes (having a duration of e.g. 1 ms) are allocated four transmission time intervals after each downlink Un subframe. Furthermore, the HARQ control handling of the Un interface is adapted in such a way that the Un interface is operated without PHICH and only the adaptive HARQ is used for the Un uplink. This means that no explicit acknowledgement (positive or negative) is transmitted from the radio access node 30 to the relay node.

Figure 2:
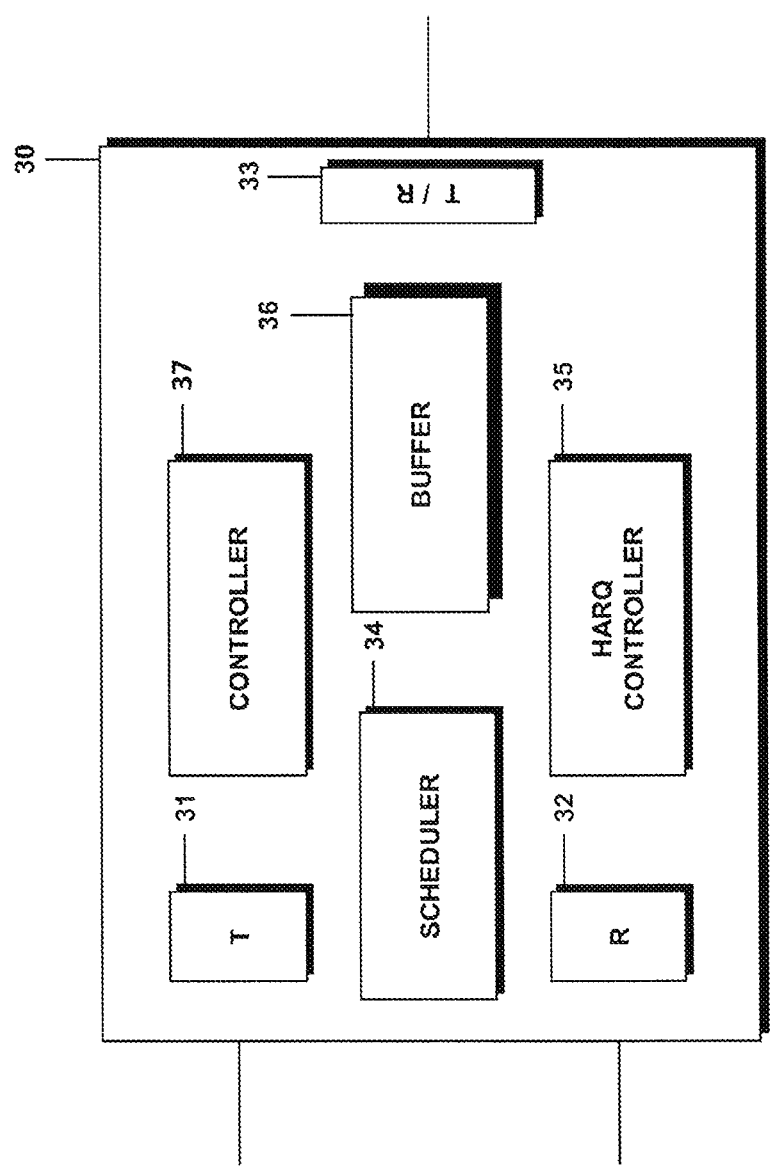
FIG. 2 is a more detailed schematic view of the eNB shown in FIG. 1.

In FIG. 2 a more detailed view of the eNB 30 is shown. The eNB comprises a transmitter 31 for downlink transmission of information to the relay node and UEs and a receiver 32 for receiving information in uplink subframes from the relay node and UEs. The transmission timeline for the transmission of information is partitioned into radio frames, each frame having ten subframes. The eNB furthermore comprises a transceiver 33 for the connection of the eNB to a core network. The eNB furthermore comprises a scheduler 34 allocating uplink subframes for the uplink transmission from the relay node to the access node and allocating downlink subframes for the downlink transmission of information from the radio access node to the relay node 20 according to the ground rule mentioned above. The scheduler also schedules up- and downlink transmissions to UEs without involvement of an RN. The radio access node furthermore comprises a HARQ controller 35 that checks the information received in an uplink subframe during a HARQ process. The HARQ controller detects whether the information received in a subframe is corrupted or not, e.g. by performing a cyclic redundancy check (CRC) for the received subframe. Furthermore, a buffer 36 is provided where the information to be transmitted to the relay node can be buffered.

The radio access node 30 furthermore comprises a controller 37 that is configuring a periodic pattern of candidate uplink subframes for uplink transmission of the information from the relay node to the radio access node 30 and configuring a periodic pattern of candidate downlink subframes for a downlink transmission of information from the radio access node to the relay node. The controller 37 configures uplink subframes four transmission time intervals after the downlink subframes. The controller 37 controls how the different subframes transmitted to the relay node and the user equipment can be used, the scheduler 34 actually allocating the transmitted information to the different subframes.

Figure 3:
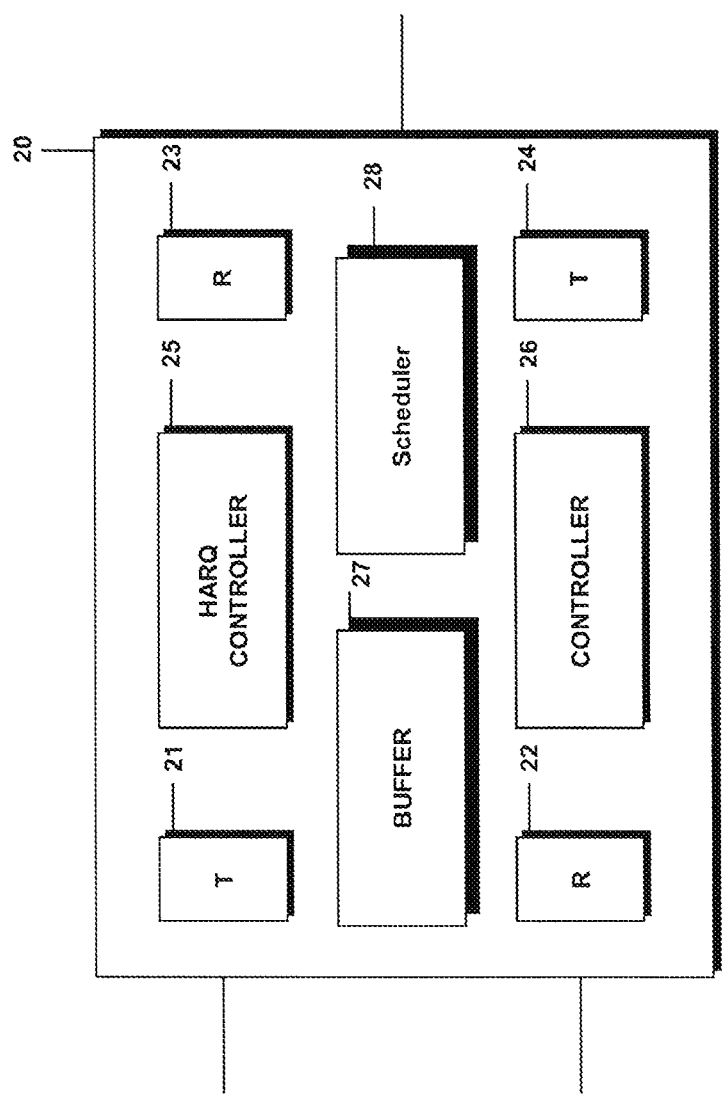
FIG. 3 is a more detailed schematic view of the relay node shown in FIG. 1.

A more detailed view of the relay node 20 is shown in FIG. 3. The relay node 20 comprises a transmitter 21 for the downlink transmission of information to the user equipment 10 and comprises a receiver 22 for receiving uplink data from the user equipment 10. Further, a receiver 23 is provided receiving downlink information from the eNB, and a transmitter 24 for transmitting uplink information to the eNB. The relay node comprises an HARQ controller 25 controlling the HARQ control handling of the information received from the eNB. The HARQ control handling may contain a plurality, e.g. eight, different HARQ processes with different associated subframes. Subdividing the control handling into consecutive processes allows that one process waits before feedback from a receiver is possibly available due to the round trip time of the transmission. Preferably, the number of processes corresponds therefore to the number of subframes in a round trip time.

As discussed above in connection with FIG. 2, adaptive HARQ processes are used on the Un uplink, meaning that the eNB does not transmit an acknowledgement feedback in response to the uplink transmission of the relay node 20. The HARQ controller 25 now assumes that the transmission was successful if no feedback is received. In case, however, the eNB 30 issues an uplink grant with the same non-toggled new data bit indicator in the next available transmission opportunity for this HARQ process, the HARQ controller 25 knows that the same information should be retransmitted which was considered corrupted by eNB as an uplink grant has been received from the eNB for this HARQ process.

The relay node 20 furthermore comprises a controller 26 that configures the MBSFN frames on the Uu interface and thus configures the scheduler 28. Scheduler 28 allocates transmission resources to the associated user equipments of the relay node, i.e. on the uplink and downlink on the Uu interface. The controller ensures also that an uplink subframe to the radio access node is transmitted to the radio access node four transmission time intervals after having received an uplink grant in a downlink subframe from the radio access node 30 in agreement with the new ground rule and the corresponding allocation by the scheduler 34 in the eNB 30. Furthermore, a buffer 27 is provided in which the subframes are temporarily buffered. The subframes contained in the buffer may be needed for retransmission if it has been determined by the HARQ controller 35 of the eNB that the received information was corrupted and that the information contained in a subframe has to be retransmitted.

FIG. 4 shows a HARQ timing of an example Un subframe allocation with 8 ms periodicity, the subframes having a length of 1 ms each in the example. The upper half of the Fig. illustrates the HARQ processes in the backhaul, here the link between the relay node and the eNB, the Un interface, and the lower half illustrates the HARQ process in the access link (Uu). Downlink transmissions (D), uplink transmissions (U), uplink ACK/NACK feedback (UAN), downlink ACK/NACK feedback (DAN) and uplink grants (G) are shown. FB denotes a feedback. Each frame comprises ten subframes from 0 to 9. In the third row the uplink HARQ process ID is shown assuming that 8 UL HARQ processes are used.

The D in the row above the DL data of eNB-R (relay) designate a subframe pattern for a downlink transmission which is e.g. preconfigured. In the present case the preconfigured periodicity is 8 ms as can be deduced from four subframes containing a D followed by four subframes without a D, followed by four subframes with a D, etc. However, only those subframes in this pattern may actually be used for eNB to relay transmission which are potential MBSFN subframes designated by an S in the MBSFN row, i.e. a backhaul downlink transmission, a transmission containing information, is only made if a subframe is both designated with an S in the MBSFN row and a D in the row above the DL data eNB-R. This means that a downlink transmission to the relay node can only be made when the relay node does not transmit information at the same time to the user equipment. The MBSFN frame structure shown in FIG. 4 indicates to the user equipment that in frames having a S no data will be received beyond the control region. Note that subframes 0, 4, 5, and 9 may not be an MBSFN subframe as described above. The MBSFN subframes are attributed in a pattern with 10 or 40 ms periodicity. FIG. 4 shows an example of a pattern with 40 ms periodicity of which only a part is shown. With the downlink transmission D also uplink grants are sent. According to the ground rule introduced above, uplink Un subframes occur four transmission time intervals after the downlink Un subframes. This means that for a downlink subframe 6 of frame 1 the uplink subframe occurs four TTIs later, i.e. for the downlinks subframe 6 of frame 1 the corresponding uplink occurs in frame 2, subframe 0. According to the modified Un uplink HARQ, explicit Un downlink feedback is not present. In case of errors uplink grants for the next available transmission opportunity are issued instead. In the example illustrated in FIG. 4 the next opportunity occurs one or two round trip times, RTTs, later. As is shown in the following example: by way of example, assume that the transmission in subframe 2 of frame 1 is corrupted. The corresponding HARQ process ID for the subframe is 4, as can be seen from FIG. 4, third row. Then the eNB issues an uplink grant with the same non-toggled data bit indicator for the next available transmission opportunity of the same HARQ process 4, which can be found in frame 2, subframe 0. Hence, the UL re-transmission is sent in frame 2, subframe 0, which is 8 subframes or one round trip time later.

The timing of downlink transmission and the corresponding HARQ feedback as well as uplink grant and the following uplink transmission is according to Rel-8. In Rel-8 each uplink data transmission in subframe N is followed by a HARQ feedback on PHICH in subframe N+4. In order to directly apply Rel-8 HARQ timing on Un, each Un uplink subframe with position N would need to be followed by a Un downlink subframe at N+4 (in addition to the above-mentioned ground rule). Obviously, the two requirements can hardly be fulfilled due to the mismatch of the HARQ RTT (round trip time, 8 ms) and the MBSFN allocation periodicity (10 ms). Therefore, a PHICH cannot be operated on the Un interface. Thus, the Un interface is operated without PHICH and only adaptive HARQ is used for the Un uplink. Consequently, a donor eNB does not transmit ACK/NACK feedback in response to an uplink transmission of a relay. The relay assumes that the transmission was successful (ACK). In the case of errors (NACK) the donor eNB issues an uplink grant with the same, non-toggled new data indicator bit (NDI) in the next available transmission opportunity for this HARQ process (synchronous HARQ), i.e. the next available Un downlink is a frame which is followed by a Un uplink subframe. The uplink grant is transmitted with an indicator if new data is requested. This indicator may have two values, the non-toggled value being transmitted when the corrupted subframe is to be sent again, and in the case of a toggled indicator new data can be sent. This modification results in adaptive, but still synchronous retransmissions for uplink HARQ processes. Since the donor eNB does not transmit explicit ACK/NACK feedback, a (R-)PHICH is not necessary. Note that adaptive retransmissions on Un slightly increase the (R-)PDICH load in the case of high block error rate targets, however a (R-)PHICH can be omitted.

In uplink direction Un subframes are muted for Uu traffic simply by not scheduling any UEs.

Since MBSFN subframes cannot be allocated with 8 ms period, some Un downlink subframes cannot be used for the Un downlink, e.g. DL subframes 0 and 9 of the first radio frame and DL subframes 4 and 5 of the second radio frame. Accordingly, the corresponding Un uplink subframes are not available for the Un uplink, e.g., frame 1 UL subframe 4 and frame 2 UL subframes 3, 8 and 9. However, those downlink subframes can be used for the Uu downlink instead. The uplink subframes can also be used for Uu uplink, but it is not ensured that a retransmission opportunity is available. Hence, in the case of errors the UL HARQ process in those subframes may be suspended. The corresponding ACK feedback 4 TTIs after the UL subframe, e.g., in frame 1 UL subframe 8 and frame 2 UL subframes 7 is indicated by an "A" instead of "DAN" in FIG. 4. The next opportunity for retransmission occurs two or three RTTs later, as indicated in the row "next opportunity". The delayed retransmission opportunities when suspending a HARQ process on Uu uplink lead to longer delay spikes. The other uplink Uu HARQ processes as well as the downlink Uu HARQ processes are not affected.

Self-interference at the relay node can be avoided by dedicating certain subframes to the eNB-RN (Un) link. Those Un subframes are unavailable for RN-UE transmissions (Uu link) by declaring DL Un subframes as MBSFN subframes and by not scheduling any UEs in UL (uplink) Un subframes. The Un HARQ process has to operate on Un subframes while the Uu HARQ operates in Uu subframes.

FIG. 5 shows the HARQ timing of an example Un subframe allocation with 10 ms periodicity. The naming convention is the same as in FIG. 4. Again, uplink Un subframes occur 4 TTIs after the downlink Un subframes (ground rule) and explicit Un downlink feedback is not present (modified Un UL HARQ). The Un allocation in FIG. 5 results in the same share of Un resources of approx. 30% as in FIG. 4.

A Un subframe allocation of 10 ms results in a 10 ms period of non-usable subframes for the Uu. Despite of the non-usable subframes, Uu uplink occurs 4 TTIs after Uu downlink so that Uplink ACK/NACK feedback is always available. Due to the possibility to transmit PHICH in MBSFN subframes, downlink ACK/NACK is always available as well. However, a synchronous retransmission opportunity cannot be ensured. Hence, in case of errors, the uplink HARQ process in those subframes may be suspended. Again, the corresponding feedback is indicated by an "A" instead of "DAN". The next opportunity for retransmissions occurs 2 or 3 RTTs later. The other uplink Uu HARQ processes as well as the downlink Uu HARQ processes are not affected.

Figure 6:
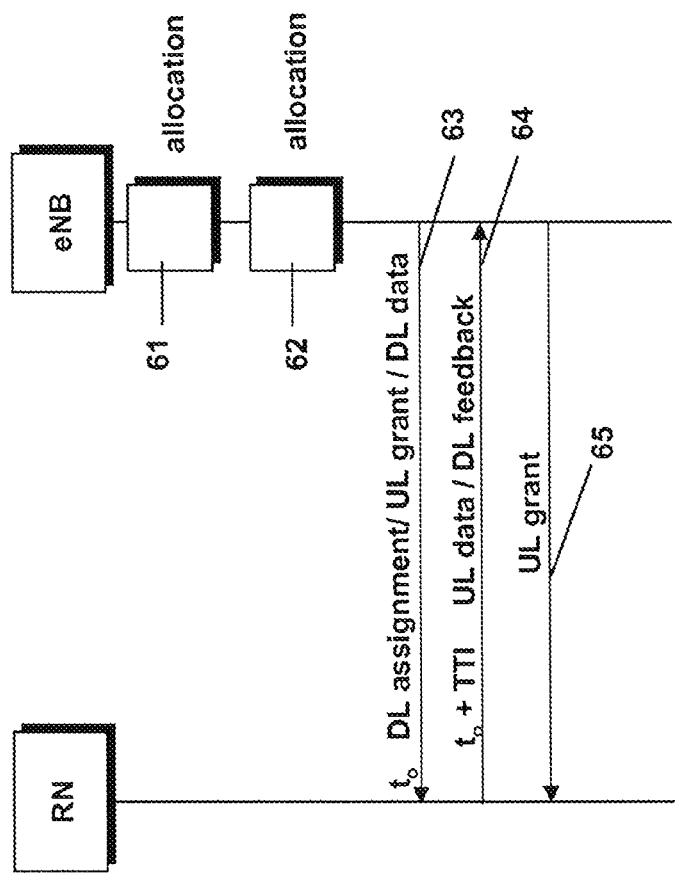
FIG. 6 shows the exchange of subframes between the relay node and the eNB according to the ground rule for Un subframe allocation and according to the Un uplink HARQ process.

In connection with FIG. 6 the new ground rule and the adapted HARQ process are summarized.

Before information is transmitted from the eNB to the RN an allocation for the subframes is carried out. FIG. 6 shows a first allocation step 61 symbolizing the allocation of a downlink subframe at the time t0 and a second allocation step 62 where an uplink subframe is allocated four transmission time intervals later.

The scheduler in the eNB allocates the subframes in the relay node in such a way that for a Un downlink transmission at time t0 an acknowledgement feedback is available four transmission time intervals after the downlink subframe. This allocation of subframes can also be used for the uplink transmission at t0+4 TTI, as the uplink grant for the uplink transmission will be transmitted in the downlink subframe at t0. Thus, when the subframe at t0 is used for an uplink grant, the data information is transmitted at t0+4 TTI. If information is transmitted at t0, the feedback is transmitted at t0+4 TTI. The allocations are signaled with subframe 63. The downlink assignment signals data in the same subframe 63 at t0 which the RN may then decode while the UL grant relates to the subsequent subframe 64 at t0+4 TTI.

FIG. 6 furthermore describes the HARQ control handling of the present invention. In the HARQ process for the UE each uplink data transmission at t0 was followed by a HARQ feedback on PHICH in subframe t0+4 TTI. According to the invention a feedback on PHICH is omitted if the information contained in the uplink subframe was not corrupted. The HARQ process carried out by the HARQ controller 35 shown in FIG. 2 determines whether the received information is of sufficient quality or not. If the quality of the received information is sufficient, the HARQ controller at the eNB does not transmit an acknowledgement feedback. If, however, the HARQ controller in the eNB determines that the quality of the received information is not sufficient, an uplink grant is transmitted in the next available transmission opportunity 65 for this HARQ process. As discussed in connection with FIGS. 4 and 5, the next available transmission opportunity is e.g. one, two or three round trip times later. The HARQ controller 25 at the relay node is now configured in such a way that it assumes that the transmission was successful if no feedback is received from the eNB. In case, however, an uplink grant with the same non-toggled new data indicator bit is received, the HARQ controller at the relay node knows that the information transmitted to the eNB was corrupted, the HARQ controller initiating the retransmission of the information for said HARQ process for which the untoggled data bit indicator was received.

The retransmitted data are retrieved from the buffer contained in the relay node. If a new data indicator in the uplink grant indicates that new data should be sent, the HARQ controller knows that a retransmission of the data is not necessary and takes new information data from a queue to be transmitted to the eNB.

The above-discussed invention has several advantages.

First of all it allows a flexible allocation meaning that Un subframes can be flexibly assigned and that different ratios of Uu and Un subframes are possible. Furthermore, a maximum resource efficiency is obtained, meaning that both allocation with 8 or 10 ms period as shown in FIGS. 4 and 5 result in the same maximum resource efficiency, i.e. all subframes can be used. This can be deduced from the percentages given in FIGS. 4 and 5 which add to 100%. Furthermore, HARQ feedback and retransmissions are available for all HARQ processes even when some retransmissions must be postponed by a round trip time or two. The HARQ protocol for Un uplink is modified, the physical layer does not provide any PHICH feedback to MAC (Medium Access Control) and an uplink HARQ process may be assumed to be positively acknowledged (relay UL grant for adaptive retransmission). Furthermore, some Uu uplink HARQ processes lack a synchronous retransmission opportunity. It is up to the relay node implementation to suspend such processes or to let them be transmitted anyway. Downlink Un HARQ and downlink Uu HARQ are not affected. Both allocations, with 8 or 10 ms period, have the same number of potentially suspended Uu uplink HARQ processes. Furthermore, the invention allows to reuse of Rel.-8 format and timing. This means that Rel.-8 PDCCH and PUCCH message formats and timing can be reused. Especially the reuse of Rel.-8 timing leads to efficient eNB schedulers which can schedule user equipments and relay nodes in the same time line. Last but not least, as there will be no explicit ACK/NACK feedback for uplink transmissions, a (R-)PHICH does not need to be standardized.

While the above embodiments are described with respect to LTE systems, it is obvious that the same principles can also generally be applied in a system in which relaying is performed between an access node and a destination node, e.g. a UE, via a relay node, wherein the radio resources for transmission with the relay node can be used for transmission to both other nodes and wherein the transmission periodicity on the link between relay and access node and the transmission periodicity on the link between relay and destination node may lead to resource conflicts.

Furthermore, the relay node and the radio access node shown in FIGS. 2 and 3 only show the functional entities that are important for the understanding of the present invention. As known to those skilled in the art, the relay node and the eNB provide more functions not discussed in detail in the present invention. Furthermore, for a better understanding of the present invention the different units are shown as separate units. However, it should be understood that a different number of units may be used and that the functions of different units may be incorporated into one unit. Furthermore, the units shown may be incorporated by hardware or software or by a combination of hardware and software.

The invention claimed is:

1. A method for controlling a transmission of information in a wireless communication network between a radio access node and a relay node, the information being transmitted in a sequence of subframes, wherein a subframe comprises a control region and an information region containing the transmitted information, a subframe corresponding to a transmission time interval, the method comprising:
    allocating a downlink subframe for a downlink transmission of information from the radio access node to the relay node, wherein a downlink subframe for a downlink transmission is only allocated when a further subframe of the same transmission time interval for a transmission from the relay node to a user equipment is a subframe of a type that indicates to the user equipment that no data are received beyond the control region; and
    allocating, for each allocated downlink subframe, an uplink subframe for an uplink transmission of information from the relay node to the radio access node four transmission time intervals later, wherein, when an uplink subframe is received from the relay node, corruption of the information contained in the received uplink subframe is checked during a Hybrid Automatic Repeat Request (HARQ) process, wherein if the subframe is not detected as corrupted, no explicit acknowledgement feedback on Physical HARQ Indicator Channel (PHICH) is transmitted back to the relay node, wherein for a corrupted received uplink subframe an uplink grant is transmitted to the relay node in a downlink subframe for a next available uplink subframe for retransmission, the uplink subframe for retransmission being associated with the HARQ process, wherein the downlink subframe is allocated four transmission time intervals before the next available uplink subframe for retransmission.

2. The method of claim 1, wherein the type of the further subframe is a Multimedia Broadcast multicast service over Single Frequency Network (MBSFN) subframe.

3. The method of claim 1, wherein the downlink subframe indicates a scheduling assignment for the transmission of information to the radio access node in the uplink subframe allocated four transmission time intervals later.

4. The method of claim 1, wherein, when the downlink subframe from the radio access node to the relay node contains the transmitted information, the uplink subframe allocated four transmission time intervals later contains the acknowledgement feedback.

5. The method of claim 1, wherein the transmitted uplink grant comprises an indicator for new data, wherein the indicator is non-toggled.

6. The method according to claim 5, wherein the indicator for new data is a new data indicator (NDI) bit.

7. The method of claim 1, wherein subframes for the downlink transmission of information to the relay node are allocated taking into account a configured periodicity of a subframe type in the transmission from the relay node to the user equipment.

8. The method of claim 1, the method comprising allocating downlink subframes for a downlink transmission of information from the radio access node to the relay node, wherein a downlink subframe for a downlink transmission is only allocated when a further subframe of the same transmission time interval for a transmission from the relay node to a user equipment is a subframe of a type that indicates to the user equipment that no data are received beyond the control region.

9. A radio access node for a wireless communication network and for controlling an exchange of information provided in a sequence of subframes with a relay node, wherein the subframe comprises a control region and an information region containing the transmitted information, a subframe corresponding to a transmission time interval, the radio access node configured to:
    allocate a downlink subframe for a downlink transmission of information from the radio access node to the relay node, wherein the radio access node is configured to only allocate a downlink subframe for a downlink transmission when a further subframe of the same transmission time interval for a transmission from the relay node to a user equipment is a subframe of a type that indicates to the user equipment that no data are received beyond the control region, wherein the radio access node is configured to allocate, for each allocated downlink subframe, an uplink subframe four transmission time intervals later;
    determine, during a Hybrid Automatic Repeat Request (HARQ) process, whether the information contained in a uplink subframe is corrupted, wherein if the radio access node detects the subframe as not corrupted the radio access node is configured to not transmit an explicit acknowledgement feedback on Physical HARQ Indicator Channel (PHICH) back to the relay node; and
    transmit a downlink subframe for a next available uplink subframe for retransmission, the uplink subframe for retransmission being associated with the HARQ process, the downlink subframe being allocated four transmission time intervals before the next available uplink subframe for retransmission, if the radio access node detects that the subframe is corrupted.

10. The radio access node according to claim 9, wherein the type of the further subframe is a Multimedia Broadcast multicast service over Single Frequency Network (MBSFN) subframe.

11. The method according to claim 9, wherein the downlink subframe indicates a scheduling assignment for the transmission of information to the radio access node in the uplink subframe allocated four transmission time intervals later.

12. The method according to claim 9, wherein, when the downlink subframe from the radio access node to the relay node contains the transmitted information, the uplink subframe allocated four transmission time intervals later contains the acknowledgement feedback.

13. The method according to claim 9, wherein the transmitted uplink grant comprises an indicator for new data, wherein the indicator is non-toggled.

14. The method according to claim 13, wherein the indicator for new data is a new data indicator (NDI) bit.

15. The method according to claim 9, wherein subframes for the downlink transmission of information to the relay node are allocated taking into account a configured periodicity of a subframe type in the transmission from the relay node to the user equipment.

16. The radio access node according to claim 9, wherein the radio access node is configured to allocate downlink subframes for a downlink transmission of information from the radio access node to the relay node, wherein a downlink subframe for a downlink transmission is only allocated when a further subframe of the same transmission time interval for a transmission from the relay node to a user equipment is a subframe of a type that indicates to the user equipment that no data are received beyond the control region.

17. A method for controlling a transmission of information in a wireless communication network between a radio access node and a relay node, the information being transmitted in a sequence of subframes, a subframe corresponding to a transmission time interval, the method comprising:
transmitting information in an uplink subframe for an uplink transmission to the radio access node four transmission time intervals after having received a scheduling assignment in a downlink subframe from the radio access node, the downlink subframe being only received when a further subframe of the same transmission time interval for a transmission from the relay node to a user equipment is a subframe of a type that indicates to the user equipment that no data are received beyond the control region;
assuming successful reception of the uplink subframe at the radio access node if no explicit feedback message acknowledging the uplink transmission in the uplink subframe is received on Physical HARQ Indicator Channel (PHICH); and
assuming that the radio access node detected corruption of the information included in the uplink subframe during a Hybrid Automatic Repeat Request (HARQ) if an uplink grant is received by the relay node from the radio access node in a downlink subframe for a next available uplink subframe for retransmission, the uplink subframe for retransmission being associated with the HARQ process, the downlink subframe being allocated four transmission time intervals before the next available uplink subframe for retransmission.

18. The method according to claim 17, wherein it is assumed that the radio access node has detected corruption of the uplink subframe if an uplink grant is received in the next available downlink subframe associated with a Hybrid Automatic Repeat Request (HARQ) process.

19. The method according to claim 17, wherein a downlink subframe to the user equipment is configured as a subframe of a type that indicates to the user equipment that no data is to be received beyond the control region if said downlink subframe of the same transmission time interval is configured for a downlink transmission of information from the radio access node to the relay node, wherein no uplink transmission from the user equipment to the relay node is allocated in a subframe which is configured for an uplink transmission from the relay node to the radio access node.

20. The method according to any one of claim 17, wherein an acknowledgement feedback message for a downlink subframe in an uplink subframe is transmitted four transmission time intervals after having received the downlink subframe.

21. The method according to any one of claim 17, wherein downlink subframes for a downlink transmission of information to a user equipment are allocated, a subframe comprising a control region and an information region containing the transmitted information, wherein subframes of a type that indicates to the user equipment that no data are received beyond the control region are allocated.

22. The method according to any one of claim 17, wherein it is checked whether an indicator for new data is contained in the uplink grant received from the radio access node, wherein already transmitted data are retransmitted if the indicator not contained in the uplink grant is non-toggled.

23. The method according to claim 22, wherein the indicator for new data is a new data indicator (NDI) bit.

24. The method according to any one of claim 17, wherein it is checked whether an indicator for new data is contained in an uplink grant received from the radio access node, wherein new data are transmitted if the indicator contained in the uplink grant is toggled.

25. The method according to claim 24, wherein the indicator for new data is a new data indicator (NDI) bit.

26. A relay node for a wireless communication network and for exchanging information provided in a sequence of subframes with a radio access node, a subframe corresponding to a transmission time interval, the relay node being configured to:
transmit information in an uplink subframe to the radio access node four transmission time intervals after having received a scheduling assignment in a downlink subframe from the radio access node, the downlink subframe being only received when a further subframe of the same transmission time interval for a transmission from the relay node to a user equipment is a subframe of a type that indicates to the user equipment that no data are received beyond the control region;
assume successful reception of the uplink subframe at the radio access node if the relay node does not receive an explicit feedback message acknowledging the uplink transmission in the uplink subframe on Physical HARQ Indicator Channel (PHICH); and
assume that the radio access node has detected corruption of the information included in the uplink subframe during a Hybrid Automatic Repeat Request (HARQ) process, if an uplink grant is received by the relay node from the radio access node in a downlink subframe for a next available uplink subframe for retransmission, the uplink subframe for retransmission being associated with the HARQ process, the downlink subframe being allocated four transmission time intervals before the next available uplink subframe for retransmission.

* * * * *

UNITED STATES PATENT AND TRADEMARK OFFICE
CERTIFICATE OF CORRECTION

Page 1 of 2

PATENT NO. : 10,348,455 B2
APPLICATION NO. : 15/282018
DATED : July 9, 2019
INVENTOR(S) : Hoymann et al.

It is certified that error appears in the above-identified patent and that said Letters Patent is hereby corrected as shown below:

On the Title Page

Item [73], delete "Telefonaktiebolaget LM Ericsson (publ," and insert -- Telefonaktiebolaget LM Ericsson (publ), --, therefor.

Page 2, item [56], Column 2, Line 2, delete "SAn" and insert -- San --, therefor.

Page 3, item [56], Column 2, Line 15, delete "Shangahi," and insert -- Shanghai, --, therefor.

In the Specification

Column 1, Line 9, delete "2016," and insert -- 2016, now Pat. No. 9,467,974, --, therefor.

Column 5, Line 31, delete "which" and insert -- which: --, therefor.

In the Claims

Column 12, Line 44, Claim 11, delete "The method according to claim" and insert -- The radio access node according to claim --, therefor.

Column 12, Line 49, Claim 12, delete "The method according to claim" and insert -- The radio access node according to claim --, therefor.

Column 12, Line 54, Claim 13, delete "The method according to claim" and insert -- The radio access node according to claim --, therefor.

Column 12, Line 59, Claim 15, delete "The method according to claim" and insert -- The radio access node according to claim --, therefor.

Signed and Sealed this
Fifth Day of May, 2020

Andrei Iancu
*Director of the United States Patent and Trademark Office*

Column 13, Line 52, Claim 20, delete "The method according to any one of claim" and insert -- The method according to claim --, therefor.

Column 14, Line 4, Claim 21, delete "The method according to any one of claim" and insert -- The method according to claim --, therefor.

Column 14, Line 11, Claim 22, delete "The method according to any one of claim" and insert -- The method according to claim --, therefor.

Column 14, Line 17, Claim 24, delete "The method according to any one of claim" and insert -- The method according to claim --, therefor.